United States Patent [19]

Day et al.

[11] Patent Number: 4,761,851
[45] Date of Patent: Aug. 9, 1988

[54] ARTICLE WITH A HANDLE BEING RETAINED BY A CUP SHAPED RETAINING ELEMENT

[75] Inventors: John A. Day, Shatterford; Roger M. Messenger, Abberley, both of United Kingdom

[73] Assignee: Healey Mouldings Limited, West Midlands, United Kingdom

[21] Appl. No.: 932,272

[22] Filed: Nov. 19, 1986

[30] Foreign Application Priority Data

Nov. 26, 1985 [GB] United Kingdom ............... 8529115

[51] Int. Cl.$^4$ .................................................. A47J 45/06
[52] U.S. Cl. .................................................... 16/110 A
[58] Field of Search ........ 16/110 A, 114 A, DIG. 24, 16/DIG.40, DIG. 41, 110 R, 114 R

[56] References Cited

U.S. PATENT DOCUMENTS

| | | | |
|---|---|---|---|
| 942,693 | 12/1909 | Wintermute | 16/DIG. 24 |
| 1,900,565 | 3/1933 | Kircher | 16/114 A |
| 2,501,940 | 3/1950 | Hibbard | 16/114 |
| 3,883,169 | 5/1975 | Fischbach | 16/114 A |
| 4,019,221 | 4/1977 | Baumgarten | 16/110 A |
| 4,511,077 | 4/1985 | Rummelburg | 228/228 |

FOREIGN PATENT DOCUMENTS

| | | |
|---|---|---|
| 32443 | 10/1953 | Luxembourg . |
| 311090 | 5/1929 | United Kingdom . |
| 472714 | 9/1937 | United Kingdom . |
| 493754 | 11/1938 | United Kingdom . |
| 768248 | 2/1957 | United Kingdom . |
| 895372 | 5/1962 | United Kingdom . |
| 1030744 | 5/1966 | United Kingdom . |
| 1162794 | 8/1969 | United Kingdom . |

Primary Examiner—M. Jordan
Attorney, Agent, or Firm—Barlow & Barlow

[57] ABSTRACT

An article such as an item of holloware such as a saucepan, comprises a body and a handle, the body having an elongate member projecting outwardly therefrom, to which the handle is attached, the handle having an internal recess receiving a retaining element, the retaining element being secured against withdrawal from the recess and having at least two inwardly extending teeth which engages the outwardly projecting member of the body, to retain the outwardly projecting member in the recess, at positions spaced longitudinally along the member.

3 Claims, 2 Drawing Sheets

ARTICLE WITH A HANDLE BEING RETAINED BY A CUP SHAPED RETAINING ELEMENT

BACKGROUND TO THE INVENTION

This invention relates to an article, and more particularly, but not exclusively to an article comprising an item of holloware such as a saucepan, and a method of attaching a handle to an article.

SUMMARY OF THE INVENTION

According to one aspect of the invention we provide an article comprising a body and a handle, the body having an elongate member projecting outwardly therefrom, to which the handle is attached, the handle having an internal recess receiving a retaining element, the retaining element being secured against withdrawal from the recess and having at least two inwardly extending teeth which engage the outwardly projecting member of the body, to retain the outwardly projecting member in the recess, at least some of the teeth of the retaining element engaging the outwardly projecting member at positions spaced longitudinally along the member.

Thus the handle is attached to the body by the teeth of the retaining element engaging the outwardly projecting member. Because at least some of the teeth engage the member at positions spaced longitudinally along the member, the member is held rigidly relative to the handle providing a secure attachment of the handle to the article.

The handle is preferably elongate or at least the recess has a longitudinal axis. The recess is preferably of a cross sectional shape to the outwardly projecting member. For example the outwardly projecting member may be rectangular in cross section and the recess may be correspondingly rectangular.

The retaining element may be generally cup-shaped having a base and one or more side walls extending from the base, the teeth extending from the side wall or walls. Where more than one side wall extends from the base, the side walls may be integrally connected together, but preferably the side walls are separated from one another by slits. Where the retaining element is generally rectangular in cross section, the element may have four side walls separated by slits at the corner of the element.

The outwardly projecting member may have ribs which engage the inside of the recess as the outwardly projectng member is received in the recess to add rigidity to the attachment. The ribs may be arranged to cooperate with the slits of the cup-shaped retaining element, or otherwise with the element to add further rigidity to the attachment.

Alternatively, the recess may be stepped, a stepped part of the recess tightly receiving a larger cross section part of the outwardly projecting member to enable rigid attachment to be achieved.

Further alternatively, any space between the outwardly projecting member and the recess may be at least partly packed, to enable rigidity to be achieved.

The retaining element may be secured agaisnt withdrawal from the recess by further outwardly projecting teeth which engage with the inside of the recess. Preferably the retaining element has outwardly extending ears in addition to, or instead of, the outwardly projecting teeth, which ears snap interengage in a receiving formation of the handle, as the retaining element is inserted into the recess. The receiving formation may for example comprise an opening provided in the handle which communicates with the internal recess.

Alternatively the retaining element could be secured against withdrawal from the recess in any other manner, for example, by adhesive or the handle may be moulded or formed around the retaining element as required.

The or a base of the retaining element may engage a blind end of the recess. Thus this engagement prevents movement of the retaining element relative to the recess in one direction, whilst the teeth, and/or outwardly extending ears, and/or adhesive or other securing means prevent movement of the retaining element in an opposite direction.

The invention has been particularly devised for use with aluminium holloware, e.g. saucepans where it has been found that the inwardly projecting teeth of the retaining element bite sufficiently into the aluminium outwardly projecting member to provide a rigid attachment. The retaining element may be made of spring steel.

According to a second aspect of the invention we provide a method of attaching a handle to an article, the article having a body with an elongate outwardly projecting member, and the handle having a recess in which a retaining element is secured, the method including the step of moving the outwardly projecting member longitudinally relative to the handle until the outwardly projecting member is received in the recess with inwardly projecting teeth of the retaining element engaging the outwardly projecting member to prevent withdrawal of the outwardly projecting member from the recess.

The method may include the step of inserting a retaining element into the recess, and securing the retaining element relative to the recess.

The retaining element is preferably inserted by a longitudinal movement of the retaining element along the recess.

The method according to the second aspect of the invention may be applied to an article having any of the features of the article in accordance with the first aspect of the invention.

The invention will now be described with the aid of the accompanying drawing in which:

DESCRIPTION OF THE PREFERRED EMBODIMENTS

Figure 1:
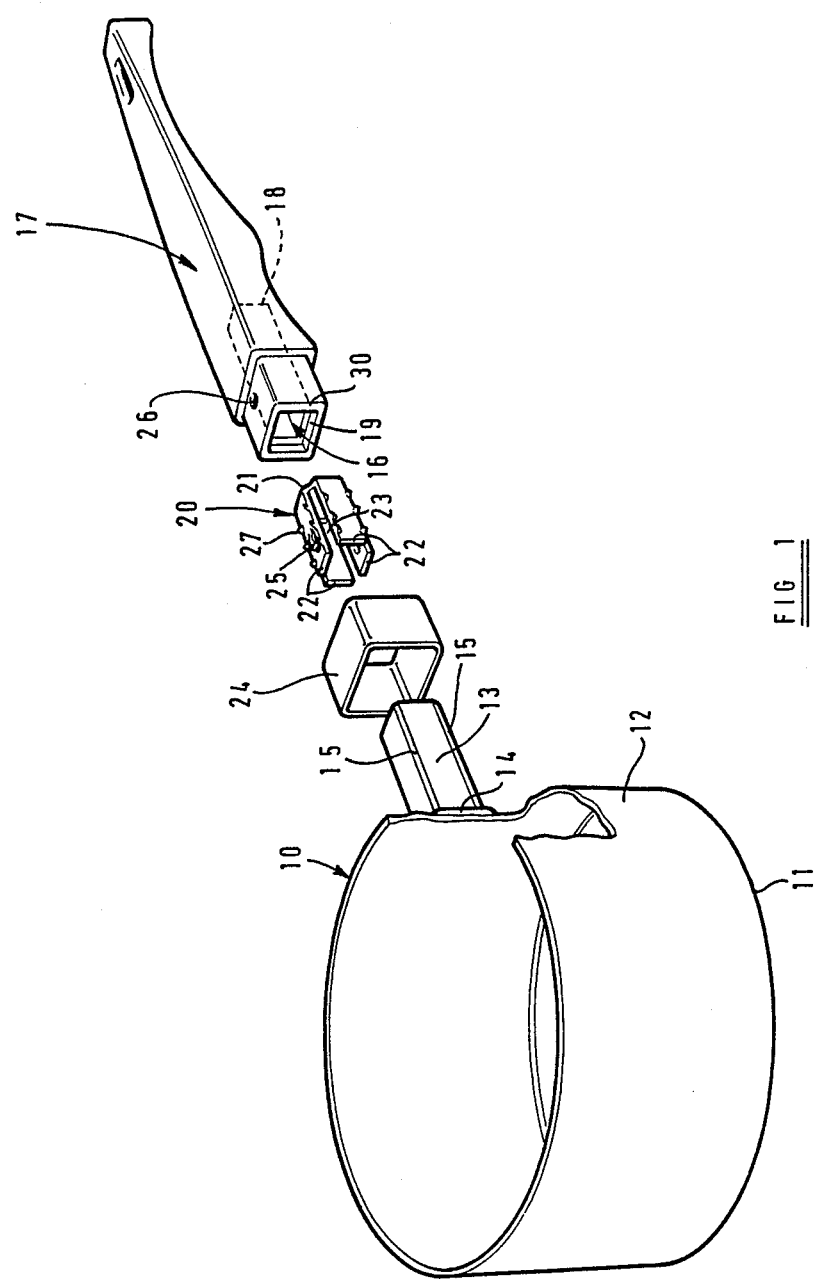
FIG. 1 is an exploded perspective view of an article in accordance with the invention to which a handle may be attached.

Referring to the drawings, an article of holloware comprises a body 10 of generally cylindrical configuration having a base 11 and a circular side wall 12. Extending outwardly from the side wall 12 is a longitudinally projecting member 13 of generally rectangular configuration which is welded as shown at 14 to the side wall.

The member 12 has at each corner thereof, an outwardly extending rib 15 which extends along substantially the entire length of the member 13.

The member 13 is adapted to be received in a recess 16 of a handle 17 which in the present example, is manufactured by moulding, in a suitable thermoplastic material.

The recess 16 is of rectangular cross section and has a blind end 18 and an enlarged part 19 at the opposite end, which is adapted to receive the weld 14.

A retaining element 20 is provided which in use, is secured within the recess 16 against withdrawal and engages the outwardly projecting member 13 of the body, to attach the handle 17 to the body 10.

The retaining element 20 is generally cup-shaped having a base 21 and foru side walls 22, the side walls 22 extending from the base 21 and being separated from one another by slits 23 at each corner.

Two opposite side walls each have an outwardly extending ear 25, the ears 25 in use, snap interengaging a receiving formation 26 comprising a through bore which extends transversly relative to, but communicates with the recess 16.

The cup-shaped retaining element 20 also has a plurality of outwardly extending teeth 27 which bite into the wall of the recess 16 as the retaining element 20 is inserted into the recess 16. It can be seen from FIG. 2 that the base 21 of the element 20 engages the blind end 18 of the recess 16 to prevent further inward movement of the element 20 as the element 20 is inserted into the recess.

The ears 25 and the outwardly extending teeth 27 wll prevent withdrawal of the element 20 from the recess 16 once the member 20 has been inserted.

Figure 2:
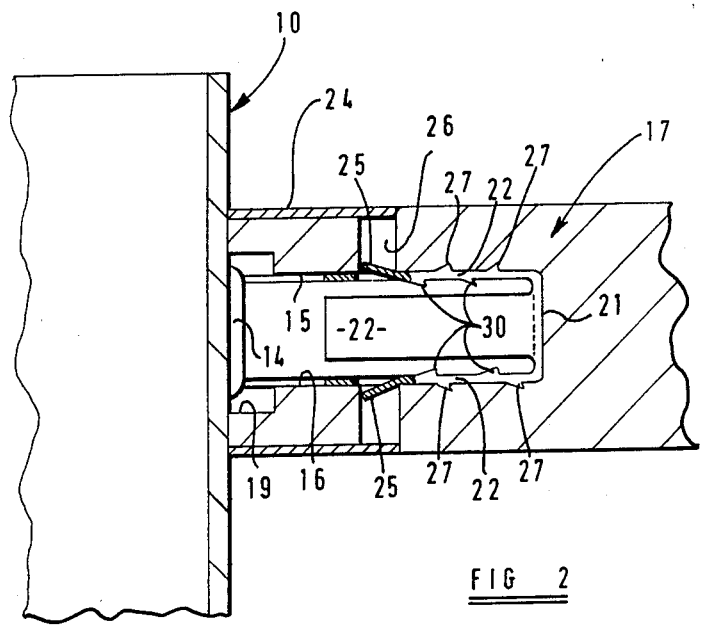
FIG. 2 is a fragmentary side cross sectional view of the article of FIG. 1, shown in an assembled condition.

The member 20 also has inwardly extending teeth 30 (which can only be seen in FIG. 2).

A ferrule 24 surrounds the handle 17 adjacent the body of the saucepan, and conceals the ends of the through bore which provides the receiving formation 26.

To attach the handle 17 to the body 10, first, the element 20 is inserted into the recess and secured against withdrawal from the recess 16 as described. It will be appreciated that this involves a movement of the member 20 longitudinally along the recess 16.

Thereafter, the outwardly projecting member 13 is inserted into the recess 16 again by means of a movement longitudinally along the recess 16, until a curved front wall 30 of the handle engages the correspondingly curved side wall 12 of the body. In this position, as can be seen from FIG. 2, the ribs 15 will tightly engage the inside of the recess 16 to provide a rigid attachment, and the ribs 15 will co-operate with the slits 23 of the cup-shaped retaining member 20 to provide further rigidity. The inwardly extending teeth 30 of the retaining element 20 will bite into the member 13 to prevent withdrawal of the member 13 from the recess 16.

Various modifications may be made without departing from the scope of the invention. For example, it is not essential for the outwardly extending projecting member 13 and recess 16 to be of corresponding rectangular configuration, but there could be of other configurations provided that withdrawal of the outwardly projecting member 13 from the recess 16 can be prevented.

The retaining element 20 need not be of the configuration described, but could be of any other suitable configuration. In some instances the outwardly extending ears 25 may not be required, and/or the outwardly extending teeth 27 may not be required. For example the retaining member 20 could be retained in the recess 16 by adhesive, or the material of the handle 17 could be formed or moulded around the retaining element 20 if required, to trap the element 20.

Instead of providing the outwardly projectng member 13 with ribs 15 which tightly engage the inside of the recess 16, the recess 16 could be stepped, so that a larger cross sectional part of the outwardly projecting member 13 tightly engages with a larger cross sectional stepped part of the recess 16 to provide the necessary rigidity or any space between the member 13 and the recess 16 could be packed.

Although the invention has been devised primarily for attaching a handle 17 to an aluminium saucepan, the invention could be applied to attaching a handle to any other item of holloware, or indeed, any other article to which it is desired to attach a handle. For example, the method may be applied to a method of attaching a handle to a steel saucepan.

We claim:

1. An article comprising a body and a handle, an elongate member projecting outwardly from the body, to which member the handle is attached, the handle having an internal recess, a generally cup-shaped retaining element received in the recess, the retaining element having a base and four side walls extending from the base the side walls being separated from one another by slits, means securing the retaining element against withdrawal from the recess, the retaining element having at least two inwardly extending teeth which engage the elongate member, at least some of the teeth of the retaining element engaging the elongate member at positions spaced longitudinally along the member, the elongate member having ribs which engage the inside of the recess as said member is received in the recess and extend through the slits of the cup-shaped retaining element.

2. An article of aluminum holloware having a body and a handle, an elongate member formed of aluminum projecting outwardly from the body, a handle attached to the member having an internal recess and a retaining element secured in the recess, means securing the retaining element against withdrawal from the recess, the retaining element being made of spring steel and having at least two inwardly extending teeth which engage the elongate member whereby the teeth of the retaining element dig into the softer metal of the elongate member.

3. An article as in claim 2 wherein the teeth of the retaining element engage the elongate member at positions spaced longitudinally along the member.

* * * * *